United States Patent
Bottine (10) Patent No.: US 10,453,362 B2
(45) Date of Patent: Oct. 22, 2019

(54) INFORMATION DISPLAY SYSTEM IN A SALES AREA

(71) Applicant: SES-imagotag, Nanterre (FR)

(72) Inventor: Philippe Bottine, Boulogne-Billancourt (FR)

(73) Assignee: SES-imagotag (FR)

(*) Notice: Subject to any disclaimer, the term of this patent is extended or adjusted under 35 U.S.C. 154(b) by 0 days.

(21) Appl. No.: 16/083,248

(22) PCT Filed: Mar. 8, 2017

(86) PCT No.: PCT/EP2017/055463
§ 371 (c)(1),
(2) Date: Sep. 7, 2018

(87) PCT Pub. No.: WO2017/153481
PCT Pub. Date: Sep. 14, 2017

(65) Prior Publication Data
US 2019/0080633 A1  Mar. 14, 2019

(30) Foreign Application Priority Data
Mar. 8, 2016 (FR) ...................... 1651909

(51) Int. Cl.
*G09F 3/20* (2006.01)
*G06F 3/147* (2006.01)

(52) U.S. Cl.
CPC ............. *G09F 3/208* (2013.01); *G06F 3/147* (2013.01); *G09F 3/204* (2013.01); *G09G 2360/04* (2013.01); *G09G 2380/04* (2013.01)

(58) Field of Classification Search
CPC .......... G09F 3/208; G09F 3/147; G09F 3/204; G09G 2380/04
See application file for complete search history.

(56) References Cited

U.S. PATENT DOCUMENTS

| | | | | |
|---|---|---|---|---|
| 5,461,561 A | * | 10/1995 | Ackerman | G06F 3/147 235/383 |
| 5,583,525 A | * | 12/1996 | Nekomoto | G06F 3/147 235/383 |
| 5,704,049 A | | 12/1997 | Briechle | |
| 6,181,299 B1 | * | 1/2001 | Frederick | G06F 3/147 345/2.1 |

(Continued)

OTHER PUBLICATIONS

French Search Report for FR Application No. 1651909, dated Dec. 2, 2016.

(Continued)

*Primary Examiner* — Gary C Hoge
(74) *Attorney, Agent, or Firm* — Lerner, David, Littenberg, Krumholz & Mentlik, LLP (57) ABSTRACT

The invention concerns an information display system in a sales area, comprising: —a support (2) comprising a module (15) managing electronic shelf labels and connection lines (40) linking the management module to the receiving space; and —a plurality of electronic shelf labels (6) housed in the receiving space of said support, wherein the electronic shelf labels (6) are connected to the connection lines (40) via connectors (63), and wherein the electronic shelf labels (6) are managed by the management module.

16 Claims, 4 Drawing Sheets

(56) References Cited

U.S. PATENT DOCUMENTS

| | | | | |
|---|---|---|---|---|
| 2002/0034067 A1* | 3/2002 | Massaro | ............... | A47F 5/0068 |
| | | | | 361/728 |
| 2003/0136832 A1* | 7/2003 | Massaro | ............... | A47F 5/0068 |
| | | | | 235/383 |
| 2004/0217167 A1* | 11/2004 | Huang | ................... | G09F 3/204 |
| | | | | 235/383 |
| 2009/0179825 A1* | 7/2009 | Enarvi | ................... | G06F 3/147 |
| | | | | 345/30 |
| 2010/0088937 A1* | 4/2010 | Lee | .......................... | G09F 3/20 |
| | | | | 40/642.02 |
| 2011/0239498 A1* | 10/2011 | Choi | ....................... | G09F 3/204 |
| | | | | 40/299.01 |
| 2012/0044056 A1* | 2/2012 | Byun | ..................... | G06F 3/147 |
| | | | | 340/10.1 |
| 2013/0286564 A1* | 10/2013 | Suzuki | ................ | H05K 5/0247 |
| | | | | 361/679.01 |
| 2014/0097943 A1* | 4/2014 | Moon | ................... | G09G 3/006 |
| | | | | 340/10.4 |
| 2014/0210692 A1* | 7/2014 | Waters | ................... | G06F 3/147 |
| | | | | 345/2.3 |
| 2015/0348449 A1* | 12/2015 | Choi | ..................... | G06Q 30/02 |
| | | | | 340/5.91 |
| 2017/0169799 A1* | 6/2017 | Kim | ....................... | G06Q 30/06 |

OTHER PUBLICATIONS

International Search Report and Written Opinion for PCT/EP2017/055463, dated May 24, 2017.

* cited by examiner

INFORMATION DISPLAY SYSTEM IN A SALES AREA

CROSS-REFERENCE TO RELATED APPLICATIONS

The present application is a national phase entry under 35 U.S.C. § 371 of International Application No. PCT/EP2017/055463, filed Mar. 8, 2017, which claims priority from French Patent Application No. 1651909, filed Mar. 8, 2016, all of which are incorporated herein by reference.

GENERAL TECHNICAL FIELD AND BACKGROUND OF THE INVENTION

The present invention concerns the association between items in a sales area and locations in said sales area.

The display of information relating to items offered for sale in a sales area is generally obtained by means of labels displaying the price of the item in particular with which a label is associated, and other information such as price per weight, etc.

The need to update displayed information has warranted the installation in numerous sales areas of electronic shelf labels (ESLs) provided with a screen on which display of information is remotely controlled.

The usefulness of such systems is essentially to provide consumers with product information, at the shelving of a sales area such as a supermarket, hypermarket, pharmacy or any other sales area, relating to each item offered for sale e.g. the price that reliably corresponds to information such as contained in the central file of the site i.e. information such as will effectively be used at the cash-out for payment of the item.

Another advantage of these known systems is to allow automated changes to be made to product information within much shorter times than with manual display, whether for particular periods of on-site special offers, for all or part of the items on sale, for reflecting cost price changes, for keeping up with inflation situations when prices must be very frequently increased, etc.

Figure 1:
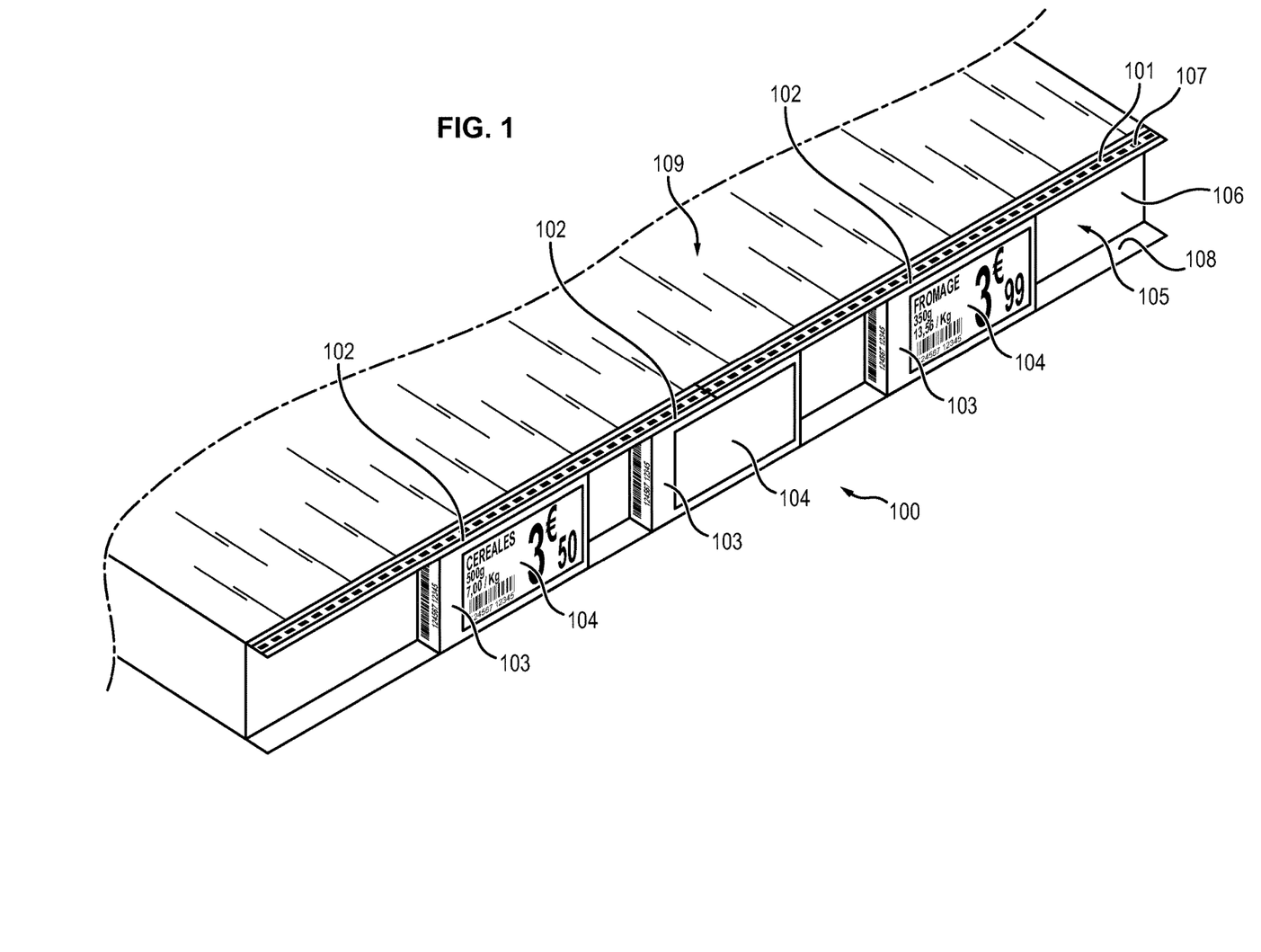
FIG. 1, already discussed, illustrates a shelf rail and electronic shelf labels in the prior art.

FIG. 1 illustrates an assembly 100 formed of a rail 101 and ESLs 102. Each ESL 102 comprises a casing 103 inside which the functional constituents of said ESL 102 are housed. An ESL has a display screen 104 to display information relating to an item with which it is associated. Typically, this information comprises the price of the item and other information usually displayed in a sales area e.g. the price per kilogram for a food product.

In addition, the ESL 102 comprises a radiofrequency communication module to receive data representing information on an item sent by a central station connected to a computer system, a memory to store said data and a microcontroller to control display of information relating to the item. These different functional constituents are arranged on a printed circuit board housed in the casing 103. The casing 103 also contains a battery cell for electrically powering the ESL 102.

The rail 101 has a U-shaped cross-section and the ESLs 102 are housed in a channel 105 formed by a bottom part 106, an upper edge 107 and a lower edge 108, the ESLs being housed between said bottom part 106, the upper edge 107 and lower edge 108.

The rail extends over the entire length of the side edge of a shelf 109 in the sales area and houses as many ESLs 102 as there are different items arranged on the shelf 109. It is therefore possible to have up to more than ten ESLs 102 per meter of rail and hence several thousand even tens of thousands of ESLs within a sales area.

Insofar as an ESL 102 comprises a high number of components, in particular electric and electronic components, an ESL 102 is therefore a costly device. The large number of ESLs 102 required to equip a sales area therefore amounts to a high cost which may become prohibitive.

It is one objective of the present invention to propose a system to display information in a sales area that is simpler and less costly and has simplified maintenance.

PRESENTATION OF THE INVENTION

One general objective of the invention is to propose a system to display information in a sales area that is more scalable, less costly whilst remaining compatible with conventional electronic shelf label solutions.

For this purpose there is proposed a support adapted to be arranged in a sales area, comprising a receiving space adapted to house a plurality of electronic shelf labels, said electronic shelf labels comprising an electronic display screen adapted to display data, said support being configured to be arranged on a shelf edge facing a navigation aisle so as to extend along said shelf edge, said support comprising:
  an electronic shelf labels management module extending along said support (2),
  connection lines linking the management module to the receiving space, said connection lines (40) being formed of conductive traces (43) extending along the receiving space (4) from the management module (15) to the surface of a connection plate, and a separator plate (50) between the connection lines (50) and the receiving space (4) has through-holes (51) placing the connection lines (40) in communication with the receiving space (4).

By using an electronic shelf labels management module within the support it is possible to obtain centralised management of several electronic shelf labels connected by the connection lines to said module, and hence to free said labels of at least some of their own management. As a result, the electronic shelf labels are able to offer the same operating functions as in the state of the art but with less complexity.

The support is advantageously completed by the following characteristics taken alone or in any technically possible combination:
  the management module comprises a communication module adapted to receive display data intended to be displayed by the electronic shelf labels, and the connection lines comprise at least one data transmission line linking the communication module to the receiving space and adapted to transmit said display data to the electronic shelf labels housed in the receiving space;
  the communication module is a radiofrequency module comprising at least one antenna;
  the management module comprises at least one power supply device and the connection lines comprise at least one power supply line linking the power supply device to the receiving space for electrically powering the electronic shelf labels housed in the receiving space;
  the power supply device is self-contained and adapted to store electrical energy;
  the management module extends along the support behind a bottom of the receiving space on the side opposite the electronic shelf labels;

the management module comprises projecting parts intended to engage with supporting wings extending from the support in a direction away from the receiving space;

the support comprises locking elements defining predetermined positions for electronic shelf labels, the through-holes of the separator plate being arranged opposite these predetermined positions.

There is also proposed an electronic shelf label adapted to be housed in a receiving space of a support of the invention, said support comprising an electronic shelf labels management module and connection lines linking the management module to the receiving space, said electronic shelf label comprising:

an electronic display screen adapted to display data, and connectors adapted to set up a connection between the connection lines and said electronic shelf label to connect said electronic shelf label to the management module.

The electronic shelf label is advantageously completed by the following characteristics taken alone or in any technically possible combination:

the electronic shelf label is configured to receive display data from the management module intended to be displayed by said electronic shelf label;

the electronic shelf label is free of any wireless communication module having a range of more than one meter;

the electronic shelf label is configured to be electrically powered by the management module via the connection lines;

the electronic shelf label is free of any self-contained power supply device;

the electronic display screen of the electronic shelf label is a polychrome display screen.

There is also proposed a system to display information in a sales area, comprising:

a support of the invention, said support comprising an electronic shelf labels management module and connection lines linking the management module to the receiving space; and a plurality of electronic shelf labels according to the invention housed in the receiving space of said support, wherein the electronic shelf labels are connected to the connection lines via connectors, and wherein the electronic shelf labels are managed by the management module.

There is also proposed a method to display information in a sales area by means of the display system of the invention, wherein:

display data are sent to the management module;

the display data are transmitted to the electronic shelf labels from the management module via the connection lines.

PRESENTATION OF THE FIGURES

Other characteristics, objectives and advantages of the invention will become apparent from the following description that is solely illustrative and non-limiting and is to be read in connection with the appended drawings amongst which.

DETAILED DESCRIPTION

Figure 2:
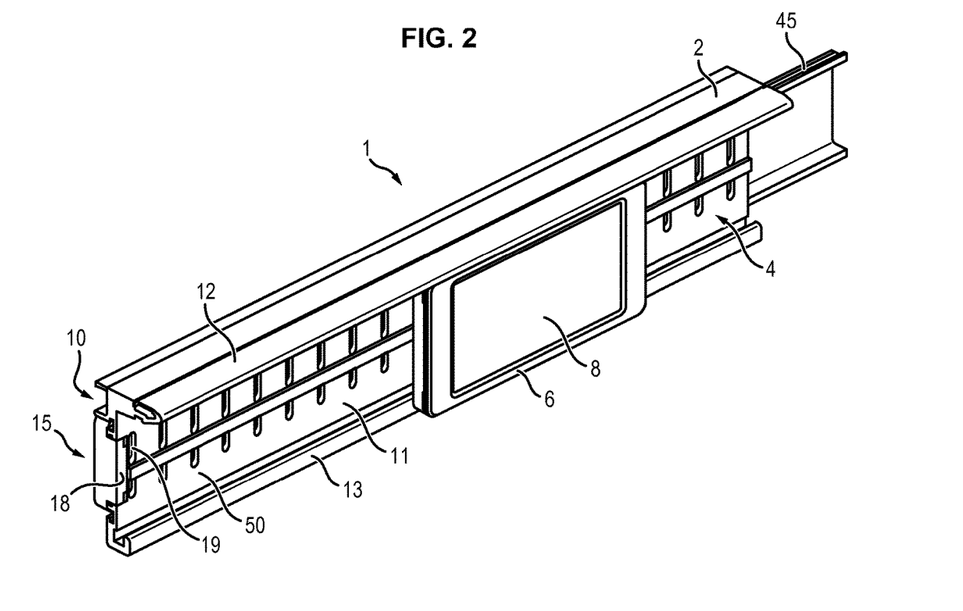
FIG. 2 illustrates an information display system for sales area according to one possible embodiment of the invention, from a three-quarter front view.

FIG. 2 shows an information display system 1 intended to be arranged in a sales area according to one embodiment of the invention. The system comprises a support 2 adapted to be arranged in the sales area, comprising a receiving space 4 adapted to house a plurality of electronic shelf labels (ESLs) 6, said electronic shelf labels comprising an electronic display screen 8 adapted to display data.

In the illustrated example, for reasons of simplicity, only a single electronic shelf label 6 is illustrated arranged in the receiving space 4 of the support 2. Evidently in practice a said support 2 houses a plurality of electronic shelf labels 6.

Typically, shelving is distributed throughout a sales area, displaying products offered for sale and composed of several superimposed shelves on which the products are arranged and which delimit aisles forming passageways within the sales area.

The support 2 is arranged on the shelf edge facing the navigation aisles. The support comprises mounting means on said shelves e.g. pegs 10 which snap-fit onto the edge of a shelf via matching shapes. The support 2 extends along the edge of a shelf of a sales area display, and houses as many electronic shelf labels 6 as there are different items arranged on the shelf. It is possible to have up to more than ten electronic shelf labels 6 per linear meter of support 2, and hence several thousand even tens of thousands of electric shelf labels in a sales area.

Typically, and as in the illustrated example, the support 2 is in the form of a U-shaped rail defining the receiving space 4 delimited by a bottom 11, an upper edge 12 and a lower edge 13, the electronic shelf labels being housed in the receiving space 4 between said bottom 11, the upper edge 12 and lower edge 13.

The support 2 comprises a module 15 managing the electronic shelf labels 6 and connection lines 40 linking the management module 15 to the receiving space 4.

The electronic labels management module 15 is configured to manage the electronic shelf labels 6 and more particularly to take in charge their external data communication and/or their electrical powering. The electronic labels management module 15 is an electrical module i.e. operating on electrical energy.

Figure 3:
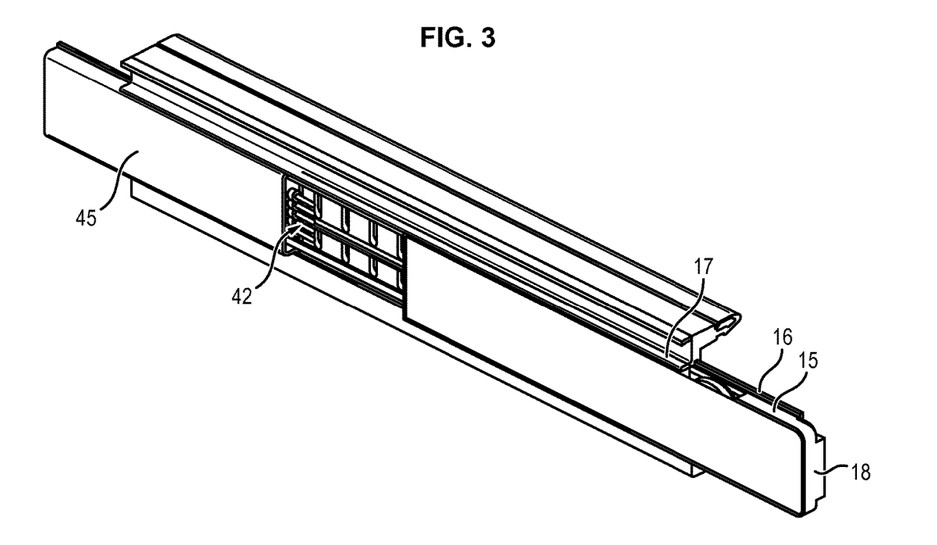
FIG. 3 illustrates the installing of an element of the support of the system in FIG. 2, from a three-quarter rear view.
Figure 4:
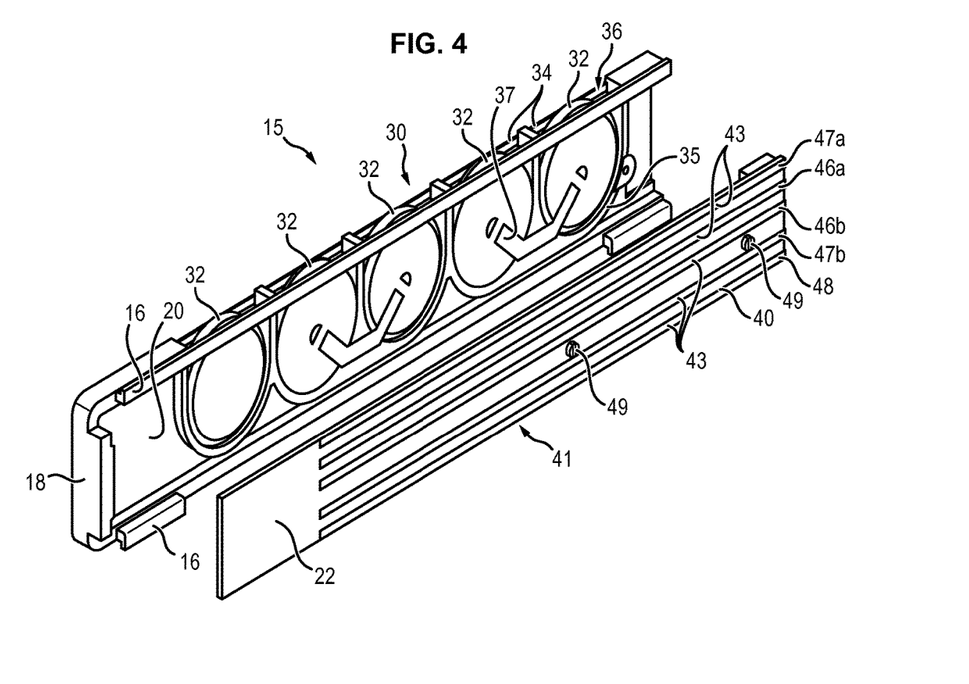
FIG. 4 illustrates the structure of a management module according to one possible embodiment of the invention.
Figure 5:
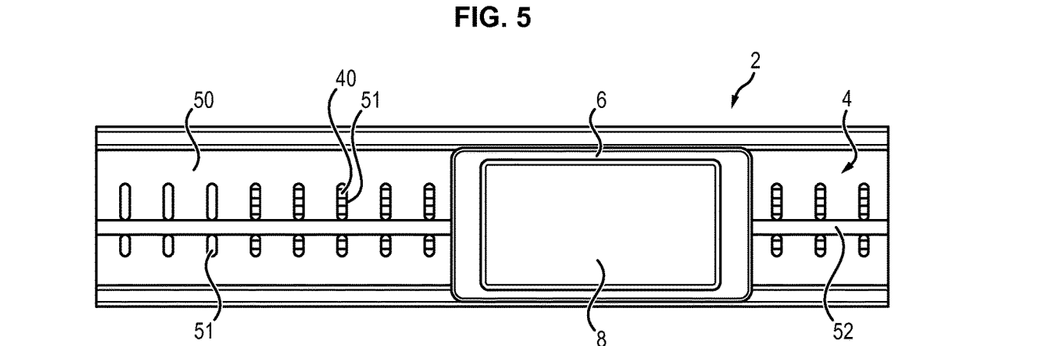
FIG. 5 gives a front view of an electronic shelf label mounted in a support according to one possible embodiment of the invention.

With reference to FIGS. 3 to 5, the management module 15 extends along the support 2 behind the bottom 11 of the receiving space 4 i.e. on the side opposite the electronic shelf labels 6. The receiving module is located at one end of the support 2.

The management module 15 is preferably detachable from the support 2 or at least it is mobile relative to the support 2 to facilitate maintenance thereof. For this purpose it may comprise projecting parts 16 intended to engage with supporting wings 17 extending from the support 2 in the direction away from the receiving space 4. An abutment 18 is provided to cooperate with a housing 19 of the support 2 to terminate the travel of the management module 15, defining its functional location.

The connection lines 40 can be designed with a detachable portion 41 joined to the management module 15. Connector pins 42 are therefore provided to engage with the portion 41 of the connection lines 40 associated with the management module 15 when inserting the management module 15 in the support 2, to restore electrical continuity of the connection lines 40.

The management module 15 comprises a communication module 20 adapted to receive display data intended to be displayed by the electronic shelf labels 6. The communication module 20 allows wireless communications to be set up with a server sending display data for remote controlling of displayed information by the electronic shelf labels 6.

These display data are typically product information such as product names and prices associated with each electronic shelf label 6, but they may also comprise other information of sales type.

This communication module 20 is preferably a radiofrequency receiver which may optionally be a transmitter. A location 22 can therefore be reserved for the radio antenna outside the receiving space e.g. at the end of the management module free of connection lines 40. It is also possible to provide for a communication module 20 communicating via infrared or via visible light or any other type of wireless connection.

The electronic shelf labels 6 are free of any wireless communication system having a range of more than five meters, possibly even of more than one meter. Contrary to prior art systems, communication with the server—optionally via relays from which the electronic shelf labels often lie distant by several meters—is ensured by the management module 15.

On the other hand, the electronic shelf labels may be provided with a peripheral near field communication device of NFC type (Near Field Communication) or RFID type (Radio Frequency IDentification), generally having a range of less than one meter.

The management module comprises at least one self-contained power supply device 30. The power supply device 30 is able to store electrical energy and to provide this energy for electrically powering the electronic shelf labels 6 arranged in the receiving space 4. The power supply device also allows electrically powering the management module 20.

The power supply device 30 comprises at least one electric battery cell or electric storage cell and may comprise a series of rechargeable cells forming a battery. In the illustrated example, the power supply device comprises five flat battery cells 32 also called button cells or elements having a total height smaller than the diameter e.g. in the form of a button or coin. They are preferably non-aqueous lithium battery cells.

These cells 32 are each arranged in a housing 34 having one rounded end 35 to follow the contour of said cells, and one end 36 is open to allow the insertion thereof. The polarities of the cells alternate. Contactors 37 come into contact with the cell poles to set up electrical contact.

The electronic shelf labels 6 are free of an electrical storage device allowing self-powering such as an electrical battery cell. Contrary to prior art systems, the electrically powering an electronic shelf label 6 is ensured by the power supply device 30 via the connection lines.

The connection lines 40 are used to connect the management module to the electronic shelf labels 6. The connection lines 40 are formed of conductive traces 43 extending along the receiving space from the management module to the surface of a connection plate positioned behind the bottom part of the receiving space. A protective cover 45 can be provided to protect the connection plate. The bottom of the receiving space 4 comprises a separator plate 50 separating the receiving space 4 from the connection lines 40.

In the example illustrated in FIG. 4, the portion 41 of connection lines 40 associated with the management module 15 can be seen. The remainder of the connection lines 40 has the same configuration. Five conductive traces 43 can be seen running parallel on the connection plate and corresponding to five connection lines 40. The number thereof can evidently be adapted according to needs.

Therefore the connection lines 40 comprise at least one data transmission line 46a, 46b linking the communication module 20 to the receiving space and adapted to transmit said display data to the electronic shelf labels 6 housed in the receiving space 4.

The connection lines 40 also comprise at least one power supply line 47a, 47b linking the power supply device 30 to the receiving space 4 for electrically powering the electronic shelf labels 6 housed in the receiving space 4.

Preferably two power supply lines 47a, 47b, corresponding to the two powering polarities, are separated by at least one data transmission line 46a, 46b. In this manner, risks of accidental short circuiting are reduced between the power supply lines 47a, 47b.

With more particular reference to FIG. 4, from top to bottom of the connection plate, a first trace is a power supply line 47a to which a first supply voltage V+ is applied. A second trace is a data transmission line 46a of positive polarity D+. A third trace is a data transmission line 46b of negative polarity D−. A fourth trace is a power supply line 47b to which a second supply voltage V− is applied.

The fifth and last trace is an additional connection line 48 which may be used for example to locate the positions of the electronic shelf labels in particular via measurement of an electrical parameter.

The connection plate may also be in two parts, one of which is associated with the management module 15 and detachable from the support 2 when removing the management module 15, whilst the other part remains engaged with the support 2.

The connection plate is secured to the connection module 15 here by means of screws 49 arranged between the two data transmission lines. Similar securing can be used for the part that is not associated with the connection module 15.

The separator plate 50 forming the bottom 11 of the receiving space 4 has through-holes 51 opposite the connection lines 40 exposing the latter to allow contact between the connection lines 40 arranged behind said separator plate 50 and the electronic shelf labels 6 arranged in the receiving space 4 in front of said separator plate 50.

The through-holes 51, as in the illustrated example, may extend perpendicular to the direction followed by the receiving space 4 so that one through-hole 51 exposes several connection lines 40.

For example, as in the illustrated example, the through-holes 51 can be regularly spaced apart in the direction followed by the receiving space 4 e.g. with a spacing of 1 cm.

A stiffening bar 52 running along the separator plate 50 and secured thereto can be provided to rigidify the receiving space 4.

The support may comprise locking elements defining predetermined positions for electronic shelf labels 6, the through-holes 51 of the separator plate being arranged facing these predetermined positions.

Figure 6:
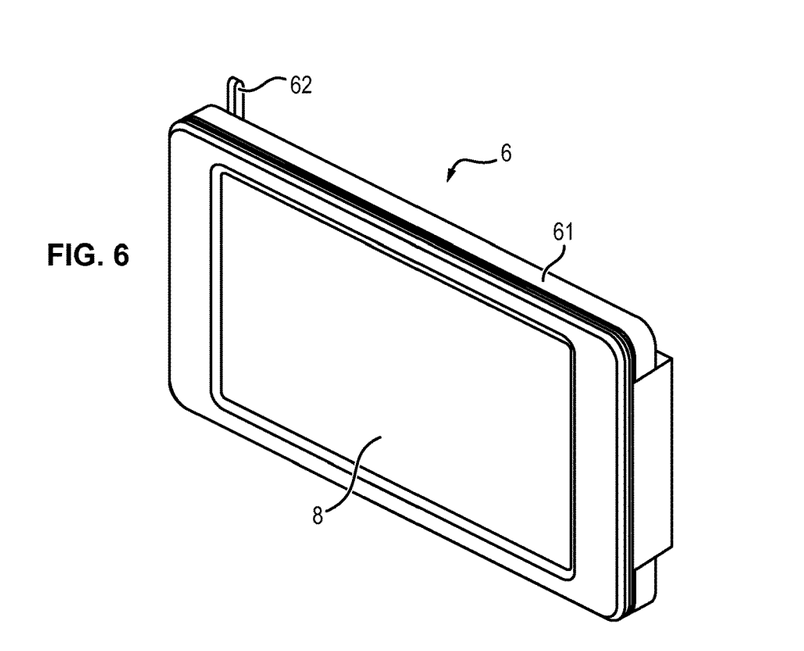
FIG. 6 gives a three-quarter front view of an electronic shelf label according to one possible embodiment of the invention.
Figure 7:
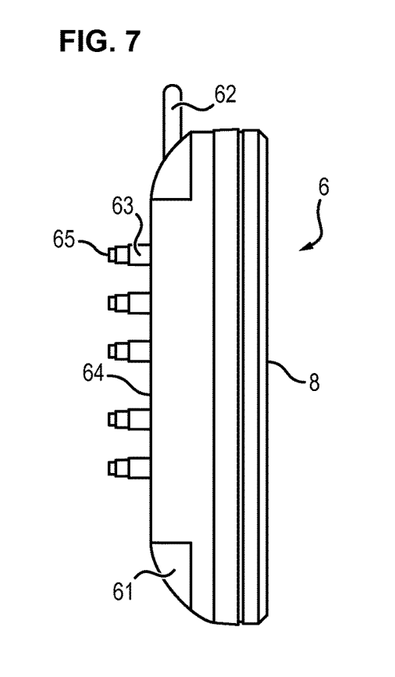
FIG. 7 gives a profile view of the electronic shelf label in FIG. 6.
Figure 8:
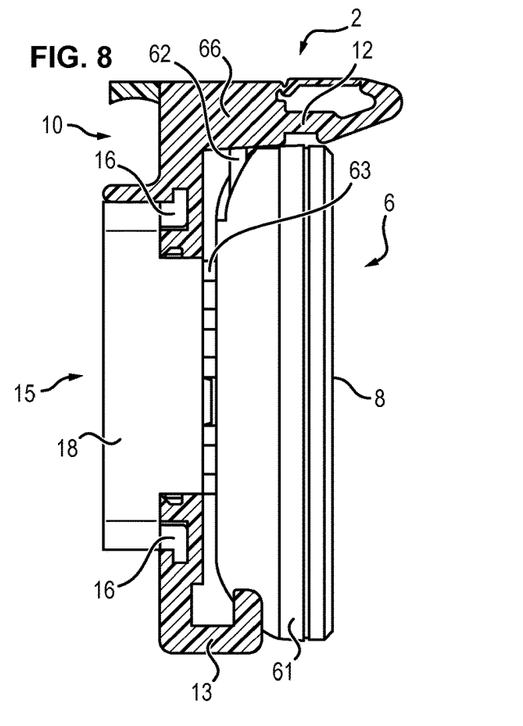
FIG. 8 is a profile view of an electronic shelf label in FIGS. 6 and 7 mounted in a support according to one possible embodiment of the invention.

With reference to FIGS. 6 to 8, an electronic shelf label 6 comprises a casing 61 generally in plastic material, and an electronic display screen 8 adapted to display data. The display screen 8 is typically a low-consumption flat screen or uses electronic ink and can offer different possibilities such as polychrome display or the display of animated sequences.

The electronic shelf label 6 preferably comprises a locking element matching the locking elements of the support. For example, as in the illustrated example, a retractable pin 62 projecting from the casing 61 can be intended to snap-fit into an orifice arranged on one edge of the receiving space 4. Application WO98/58360 presents such a locking system for an electronic shelf label.

As can be seen in FIG. 7, the electronic shelf label 6 also comprises connectors 63 adapted to set up a connection between the connection lines 40 and said electronic shelf label 6 to connect said electronic shelf label 6 to the management module 15. There is at least one connector 63 per utilized connection line 40. The connectors 63 are typically formed of a conductive material, typically metal.

The connectors 63 are arranged at the back 64 of the electronic shelf label, on the side opposite the display screen 8. When the electronic shelf label 6 is placed in position in the receiving space 4 of the support 2, the connectors 63 pass through the through-holes 51 and come into contact with the conductive traces 43 forming the connection lines 40.

To ensure good contact and to facilitate the positioning thereof, the connectors 63 may comprise a retractable tip 65 drawn outwards by an elastic return member such as a spring.

FIG. 8 illustrates an example of an electronic shelf label 6 mounted in the receiving space 4 of a support between the lower edge and upper edge. The locking element 62 of the electronic shelf label can be seen engaged with the matching locking element 66 of the support 2.

The method to display information in a sales area by means of an information display system 1 such as presented comprises the following steps.

Display data are sent to the management module 15. More specifically, these display data are sent to the communication module 20 of this management module 15. Preferably they are sent using wireless communication technology. For example, for radiofrequency communications, display data are sent from a transmitter antenna to the antenna of the communication module 20 optionally via radio relays.

Other technologies can be used. For example the display data can be communicated to the management module via visible or infrared light.

These display data are generally derived from a computer server. They typically concern the updating of information relating to the items associated with the electronic shelf labels 6, such as prices.

The display data comprise an identifier of the electronic shelf label 6 intended to receive said display data. Data received by the management module 15 are transmitted to the electronic shelf labels 6 via the connection lines 40 linking the management module to the receiving space 4 in which the electronic shelf labels 6 are housed.

More specifically, the display data transit via the data transmission lines 46a, 46b linking the communication module 20 to the receiving space 4, travel through the separator plate 50 via the connectors 63 passing through the through-holes 51 so as to reach the electronic shelf labels 6. The electronic shelf label 6 receiving the display data identifies itself by means of identifiers contained in the display data and takes these data into account to determine the information to be displayed by its display screen 8.

In this manner a display system is obtained fulfilling the same functions as prior art systems but with pooling of the members managing the electronic shelf labels 6, allowing a reduction in the cost and facilitated use thereof.

The invention is not limited to the embodiment described and illustrated in the appended Figures. Modifications remain possible in particular regarding the composition of the various elements or substitution by technical equivalents without departing from the scope of protection of the invention.

The invention claimed is:

1. A support adapted to be arranged in a sales area, comprising a receiving space configured to allow a back of a plurality of electronic shelf labels to be fitted into said receiving space, said electronic shelf labels comprising an electronic display screen adapted to display data, said support being configured to be arranged on a shelf edge facing a navigation aisle so as to extend along said shelf edge, ewherein the support comprises:
   an electronic shelf labels management module extending along said support;
   connection lines linking the management module to the receiving space, said connection lines being formed of conductive traces extending along the receiving space from the management module to the surface of a connection plate, and a separator plate configured to extend facing the electronic shelf labels, between the connection lines and the receiving space, having through holes placing the connection lines in communication with the receiving space.

2. The support according to claim 1, wherein the management module comprises a communication module adapted to receive display data intended to be displayed by the electronic shelf labels, and the connection lines comprise at least one data transmission line linking the communication module to the receiving space and adapted to transmit said display data to the electronic shelf labels housed in the receiving space.

3. The support according to claim 2, wherein the communication module is a radiofrequency module comprising at least one antenna.

4. The support according to claim 1, wherein the management module comprises at least one power supply device and the connection lines comprise at least one power supply line linking the power supply device to the receiving space for electrically powering the electronic shelf labels housed in the receiving space.

5. The support according to claim 4, wherein the power supply device is self-contained and adapted to store electrical energy.

6. The support according to claim 1, wherein the management module extends along the support behind a bottom of the receiving space on the side opposite the electronic shelf labels.

7. The support according to claim 1, wherein the management module comprises projecting parts intended to engage with supporting wings extending from the support in a direction away from the receiving space.

8. The support according to claim 1, wherein the support comprises locking elements defining predetermined positions for electronic shelf labels, the throughholes of the separator plate being arranged opposite these predetermined positions.

9. An electronic shelf label adapted to be housed in a receiving space of a support according to claim 1, said support comprising an electronic shelf labels management module and connection lines linking the management module to the receiving space, said electronic shelf label comprising:
a back which is configured to be fitted into the receiving space,
an electronic display screen adapted to display data, and
connectors adapted to set up a connection between the connection lines and said electronic shelf label to connect said electronic shelf label to the management module, said connectors being configured to pass through the throughholes of a separator plate which faces the electronic shelf label when the electronic shelf label is housed in the receiving space, and to come into contact with the conductive traces forming the connection lines.

10. The electronic shelf label according to claim 9, said electronic shelf label being configured to receive display data from the management module intended to be displayed by said electronic shelf label.

11. The electronic shelf label according to claim 10, said electronic shelf label being free of any wireless communication module having a range of more than one meter.

12. The electronic shelf label according to claim 9, said electronic shelf label being configured to be electrically powered by the management module via the connection lines.

13. The electronic shelf label according to claim 12, said electronic shelf label being free of any self-contained power supply device.

14. The electronic shelf label according to claim 9, wherein the electronic display screen of the electronic shelf label is a polychrome display screen.

15. An information display system in a sales area, comprising:
a support adapted to be arranged in a sales area, comprising a receiving space configured to allow a back of a plurality of electronic shelf labels to be fitted into said receiving space, said electronic shelf labels comprising an electronic display screen adapted to display data, said support being configured to be arranged on a shelf edge facing a navigation aisle so as to extend along said shelf edge, wherein the support comprises:
an electronic shelf labels management module extending along said support;
connection lines linking the management module to the receiving space, said connection lines being formed of conductive traces extending along the receiving space from the management module to the surface of a connection plate, and a separator plate configured to extend facing the electronic shelf labels, between the connection lines and the receiving space, having through holes placing the connection lines in communication with the receiving space, and
a plurality of electronic shelf labels according to claim 9 housed in the receiving space of said support, wherein the electronic shelf labels are connected to the connection lines via connectors, and wherein the electronic shelf labels are managed by the management module.

16. A method to display information in a sales area by means of an information display system according to claim 15, wherein:
display data are sent to the management module,
the display data are transmitted to the electronic shelf labels from the management module via the connection lines.

* * * * *